(12) United States Patent
Knorrn et al.

(10) Patent No.: US 9,731,843 B2
(45) Date of Patent: Aug. 15, 2017

(54) ARTICULATED JOINT FOR DEPLOYING AND LOCKING A SOLAR GENERATOR OR A REFLECTOR

(71) Applicant: Astrium GmbH, Taufkirchen (DE)

(72) Inventors: Raoul Knorrn, Germering (DE); René Meurer, Bruckmuehl (DE)

(73) Assignee: Astrium GmbH, Taufkirchen (DE)

( * ) Notice: Subject to any disclaimer, the term of this patent is extended or adjusted under 35 U.S.C. 154(b) by 507 days.

(21) Appl. No.: 14/347,802

(22) PCT Filed: Sep. 27, 2012

(86) PCT No.: PCT/EP2012/004044
§ 371 (c)(1),
(2) Date: Mar. 27, 2014

(87) PCT Pub. No.: WO2013/045088
PCT Pub. Date: Apr. 4, 2013

(65) Prior Publication Data
US 2014/0230188 A1    Aug. 21, 2014

(30) Foreign Application Priority Data

Sep. 28, 2011    (DE) .................. 10 2011 114 473

(51) Int. Cl.
*B64G 1/22*    (2006.01)
*F24J 2/36*    (2006.01)
(Continued)

(52) U.S. Cl.
CPC ............. *B64G 1/222* (2013.01); *F24J 2/36* (2013.01); *H02S 30/20* (2014.12); *B64G 1/44* (2013.01);
(Continued)

(58) Field of Classification Search
CPC .. B64G 1/222; B64D 27/24; B64D 2027/026; B64C 2201/042; Y10T 16/5388;
(Continued)

(56) References Cited

U.S. PATENT DOCUMENTS 4,373,690 A * 2/1983 Stillman ................ B64G 1/222
136/245
5,356,095 A    10/1994 Aker
(Continued)

FOREIGN PATENT DOCUMENTS

DE    32 15 431 A1    10/1983
DE    43 37 968 A1    5/1994
(Continued)

OTHER PUBLICATIONS

International Search Report (PCT/ISA/210) with English translation dated Jan. 23, 2013 (Seven (7) pages).
(Continued)

*Primary Examiner* — Jonathan Masinick
(74) *Attorney, Agent, or Firm* — Crowell & Moring LLP (57) ABSTRACT

A joint for unfolding and locking a solar generator or a reflector, or other aerospace components that can be unfolded, includes two half joints, a joint axis, and a drive. A drive spring of the drive has a progressive characteristic curve over the unfolding angle of the two half joints, which increases over the unfolding, to compensate for a frictional torque that varies over the unfolding angle.

11 Claims, 6 Drawing Sheets

(51) Int. Cl.
*H02S 30/20* (2014.01)
*B64G 1/44* (2006.01)
*B64G 1/66* (2006.01)

(52) U.S. Cl.
CPC ............... *B64G 1/66* (2013.01); *Y02E 10/40* (2013.01); *Y10T 16/538* (2015.01)

(58) Field of Classification Search
CPC ......... Y10T 16/53883; Y10T 16/53885; Y10T 16/53888; Y10T 16/5389; E05F 1/1207; E05F 1/1215; E05F 1/1223; E05F 1/10; E05F 1/1008; E05F 1/1016; E05F 1/1025; E05F 1/1033; E05F 1/1041; E05F 1/105; E05F 1/1058; E05F 1/1066; E05F 1/1075; E05F 1/1083; E05F 1/123
See application file for complete search history.

(56) References Cited

U.S. PATENT DOCUMENTS

| | | | |
|---|---|---|---|
| 5,393,018 A | 2/1995 | Roth et al. | |
| 5,546,632 A * | 8/1996 | Robinson | B64G 1/22 16/277 |
| 5,600,868 A | 2/1997 | Tourville et al. | |
| 5,785,280 A * | 7/1998 | Baghdasarian | B64G 1/222 136/245 |
| 5,911,536 A | 6/1999 | Roth | |
| 5,975,468 A | 11/1999 | Moignier et al. | |
| 6,010,096 A * | 1/2000 | Baghdasarian | B64G 1/222 160/135 |
| 6,158,088 A | 12/2000 | Bulboaca | |
| 6,682,020 B2 * | 1/2004 | Janson | B64G 1/222 244/172.6 |
| 2015/0303582 A1 * | 10/2015 | Meschini | B64G 1/222 343/840 |

FOREIGN PATENT DOCUMENTS

| | | |
|---|---|---|
| DE | 196 49 741 A1 | 6/1998 |
| DE | 100 23 852 A1 | 3/2001 |
| FR | 2 684 638 A1 | 6/1993 |
| JP | 54-103238 A | 8/1979 |
| JP | 61-261197 A | 11/1986 |
| JP | 63-167581 U | 11/1988 |

OTHER PUBLICATIONS

Japanese Office Action issued in Japanese counterpart application No. 2014-532274 dated Dec. 13, 2016, with partial English translation (Four (4) pages).

* cited by examiner

ARTICULATED JOINT FOR DEPLOYING AND LOCKING A SOLAR GENERATOR OR A REFLECTOR

BACKGROUND AND SUMMARY OF THE INVENTION

The invention relates to a joint for unfolding and locking a solar generator or a reflector, or other aerospace components that can be unfolded.

Solar generators or reflectors constitute unfolding systems of single, flexible segments, by way of example, which are unfolded in space after a transport phase is completed, for example. The unfolding can be performed by spring-powered or motor-powered unfolding joints, by means of which the individual segments can be directly connected, or by means of which rigid booms which act on the segments are connected. Such known joints have a very high unfolding torque at the start of the unfolding of a solar generator or reflector, the same being able to pivot about 180°. As a result the system components are subjected to high loads. Towards the end of the unfolding, known joints have a relatively low torque that is not sufficient to fully unfold the solar panel or the reflector in adverse conditions.

In order to ensure that approximately the same unfolding torque is applied over the entire duration of the unfolding, German patent document DE 196 49 741 A1 discloses a joint wherein it is possible, as a result of the shape of a sliding curve, to store part of the unfolding energy of a coil spring providing the drive, in a first half of the unfolding, in a yoke spring, and to direct this stored energy during the second half of the unfolding back to the movement via the control curve. German patent document DE 100 23 852 A1 discloses a joint consisting of two half joints, an axis of rotation, and a drive, wherein the drive has a drive spring designed as a constant force spring that generates a nearly constant torque during the unfolding, over the entire unfolding range. The loads on both the system components and the joint are reduced as a result of the approximately even unfolding torque. Moreover, interference torques on the axis are also reduced. In particular, impact forces arising during the unfolding are reduced. Because there is a greater unfolding torque even in the end position, the same typically characterized by a locked position, the joint bearing is under continuous compression force, such that a joint unit is ensured which has no play.

In practice, neither constant force springs nor other drives are yet capable of providing truly even unfolding torque. This is due to the fact that, among other things, it is not possible to take into account, and compensate for, frictional torques arising during the unfolding of the joint, over the unfolding process. The frictional torque is produced by electrical conductors of the solar generator or reflector that are routed across joint axes for the purpose of transmitting the electrical power, and which must be "bent" during the unfolding. As a result, the risk still exists that the rotary movement of the segments of the solar generator or reflector is suddenly halted once the unfolded position is reached, as the result of a locking of the joint. As a result, high "locking torques" are created, and must be taken into account when the size of the segments of the solar generator or reflector is designed. Moreover, there is a risk of loads on the unfolding mechanism that are too high. Particularly at the beginning and at the end of the unfolding, the load on the materials of the individual components is the greatest, such that the same is significant in the design of the sizing of the components.

Exemplary embodiments of the present invention provide a joint for unfolding and locking a solar generator, a reflector, or other aerospace components that can be unfolded, particularly for use in space, wherein the joint reduces the material load on the individual components.

The invention provides a joint for unfolding and locking a solar generator or a reflector, or other aerospace components which can be unfolded, consisting of two half joints, a joint axis, and a drive. According to the invention, a drive spring of the drive has a progressive characteristic curve over the unfolding angle of the two half joints, which increases over the unfolding, for the purpose of compensating a frictional torque that varies over the unfolding angle.

It is possible to take into account, and compensate, the frictional torque that increases over the unfolding angle as a result of a progressive spring characteristic curve. As a result, there is a mitigation in the reduction of the locking torque in the so-called partial unfolding, wherein only each of the outermost segments is opened by 90° for the transfer orbit. Moreover, there is a reduced load on the components and materials during the full unfolding of the segments of the solar generator or reflector. A further advantage is that it is possible to extend a joint used according to the invention to multiple unfolding axes. As a result of the frictional torques being taken into account over the spring characteristic curve, particularly those resulting from the wiring, it is also possible to accept and compensate for higher frictional torques due to other wiring at higher power output.

It is advantageous if the spring characteristic curve is selected in such a manner that the same corresponds over the entire unfolding angle to at least a predetermined multiple of the frictional torque, particularly to the triple of the frictional torque of the half joints rotated against each other. It is particularly advantageous if the spring characteristic curve is selected in such a manner that the same corresponds over the entire unfolding angle exactly to a predetermined multiple of the frictional torque, particularly to the triple of the frictional torque of the half joints rotated against each other. As a result, it is ensured that even in a "worst case" scenario, the opening torque is sufficiently high compared to the sum of all frictional torques.

In a further preferred embodiment, the drive is based on a constant force spring B-motor wherein the drive spring is arranged on a drive roll and a fixed end of the drive spring is fixed to the drive roll, and a free end of the drive spring runs around the joint axis. The drive spring has a shape that is other than a rectangular shape when it is extended to provide a progressive spring characteristic curve. The drive spring is arranged on and/or in the constant force spring B-motor in such a manner that it is wider facing inward. As a result, the spring torque constantly increases over the unfolding process.

According to an alternative or additional embodiment, the drive spring has a trapezoidal shape that is narrower towards its free end. According to the desired spring characteristic curve, the contour of the drive spring can also have other shapes which deviate from the preferred trapezoidal shape.

According to a further alternative or additional embodiment, the natural radius of the drive spring is greater towards its free end. In this embodiment the drive spring can be arranged on a non-circular drive roll or a non-circular supply roll, which rotates about the joint axis. As a result of the curve profile, meaning the radius, the drum is able to influence the spring torque in the desired manner.

According to a further alternative or additional embodiment, the drive spring is formed from multiple leaves of different lengths. The drive spring consists of a number of individual leaves. In order to achieve the progressive spring characteristic curve, different leave lengths are selected such that only a few—for example at least one—spring leaves are active at the beginning of the unfolding. The more the joint opens, the more spring leaves become active, which in turn leads to the increasing spring torque. The overall characteristic curve in this case will have a more step-like profile, in contrast to a trapezoidal embodiment of the drive spring.

In addition, the drive spring can have one or multiple recesses along its center line.

Because of constructive considerations, it is not possible to regulate the speed of the unfolding of the solar generator or reflector. In conventional joints, as a result, there is a high speed at the moment of the locking, particularly during the partial unfolding, wherein only each of the outermost segments is opened by 90° for the transfer orbit. The locking torque created in principle in the process can be reduced by the joint according to the invention because the drive spring releases comparably less energy up to this angular position.

As a result of the progressive characteristic curve that releases the same torque at the start of the unfolding as the drive mechanisms known to date, the load on the components, with respect to their strength, is not higher than before. However, due to the progressive spring characteristic curve, a significantly higher spring torque is obtained at the end of the unfolding. As a result, higher frictional torques from the wiring are acceptable. The characteristic curve in this case is selected in such a manner that, at the end of the unfolding, it corresponds to the predetermined multiple, particularly the triple, of the frictional torque.

BRIEF DESCRIPTION OF THE DRAWING FIGURES

The invention is described in greater detail below with reference to an embodiment in the drawings, wherein.

DETAILED DESCRIPTION

Figure 1:
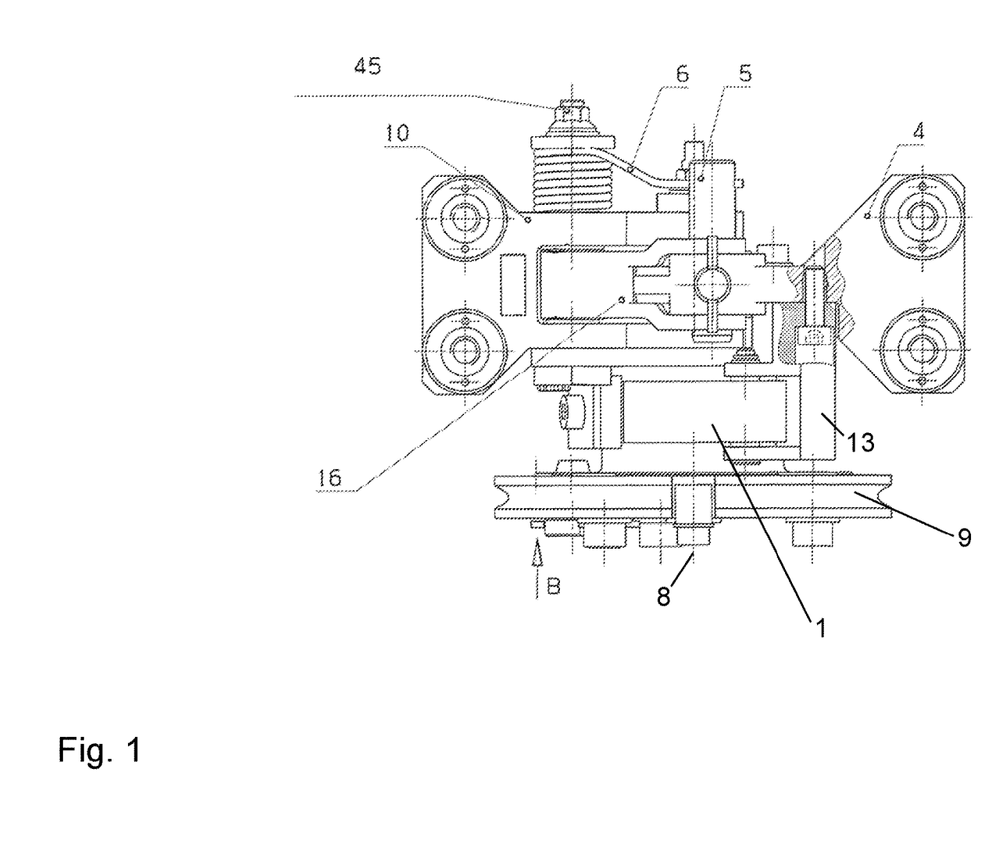
FIG. 1 shows a side view of a joint for unfolding and locking a solar generator or reflector, the principle of which is known.
Figure 2:
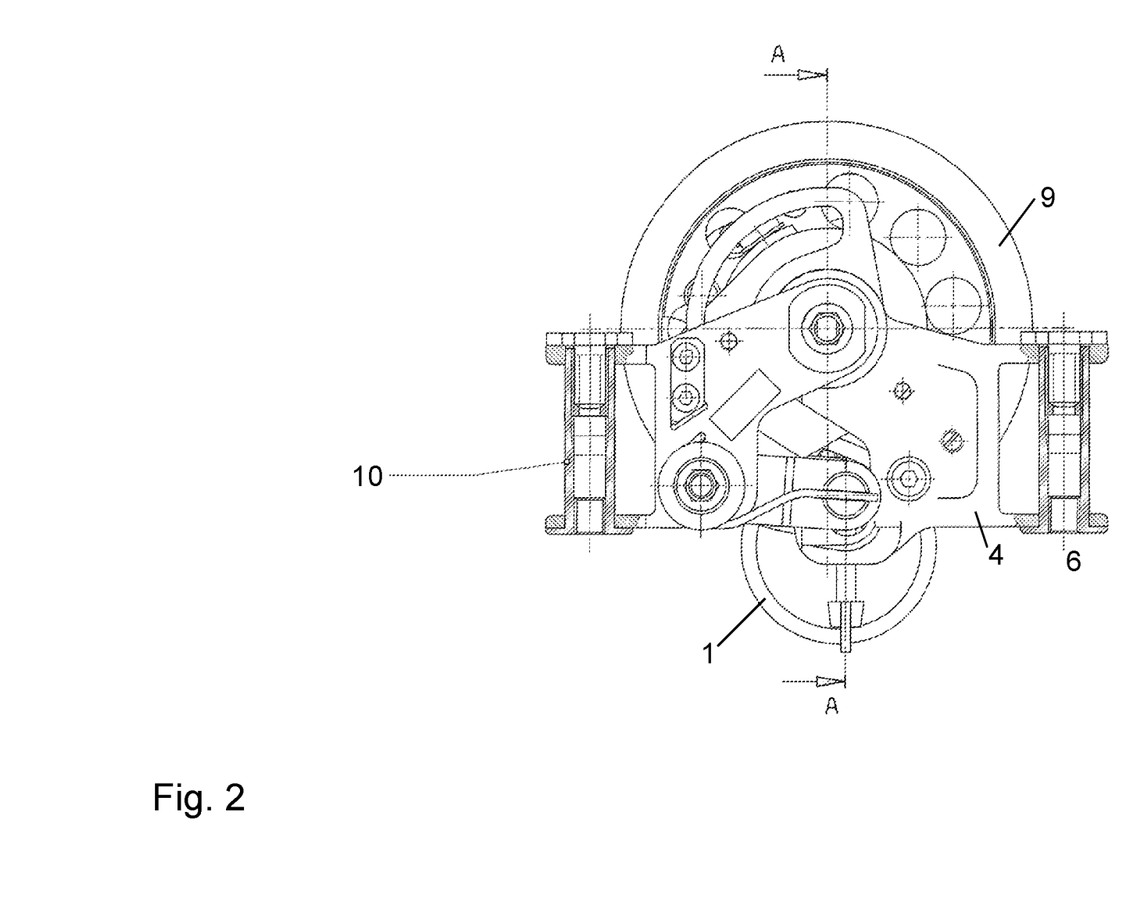
FIG. 2 shows a top view of the joint in FIG. 1.
Figure 3:
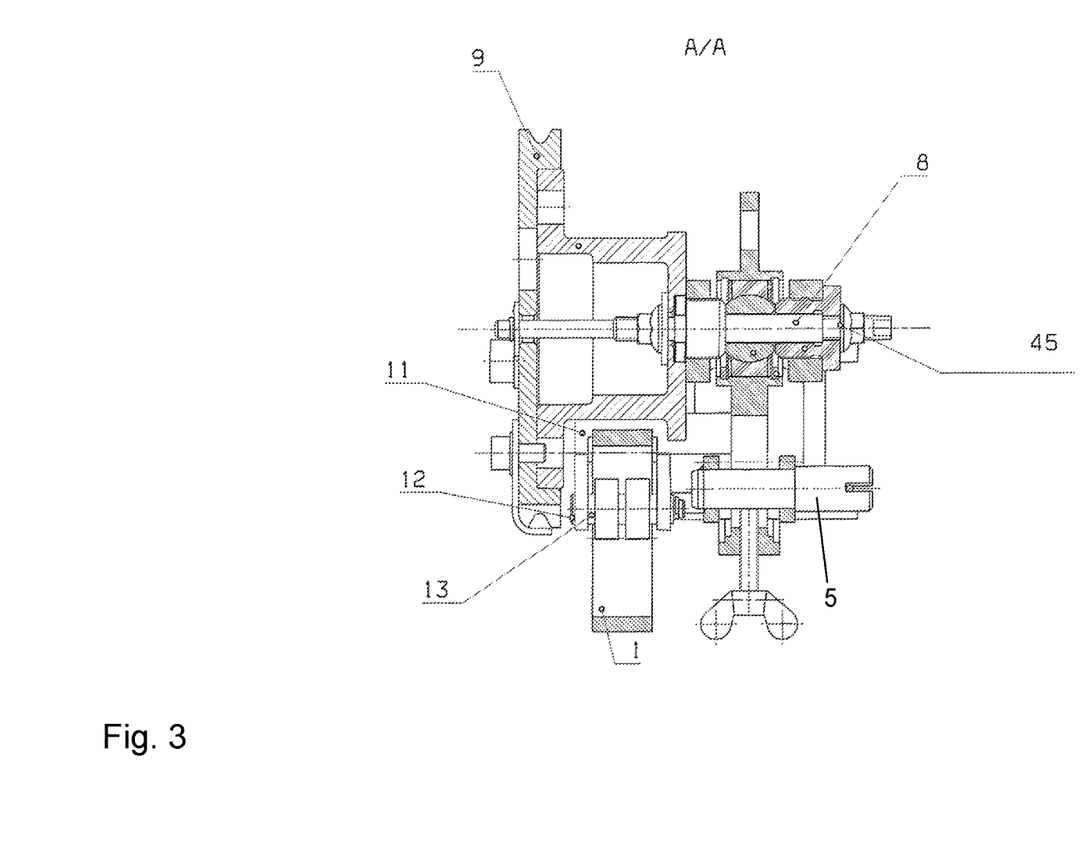
FIG. 3 shows a cutaway view along line A-A of the joint in FIG. 2.
Figure 4:
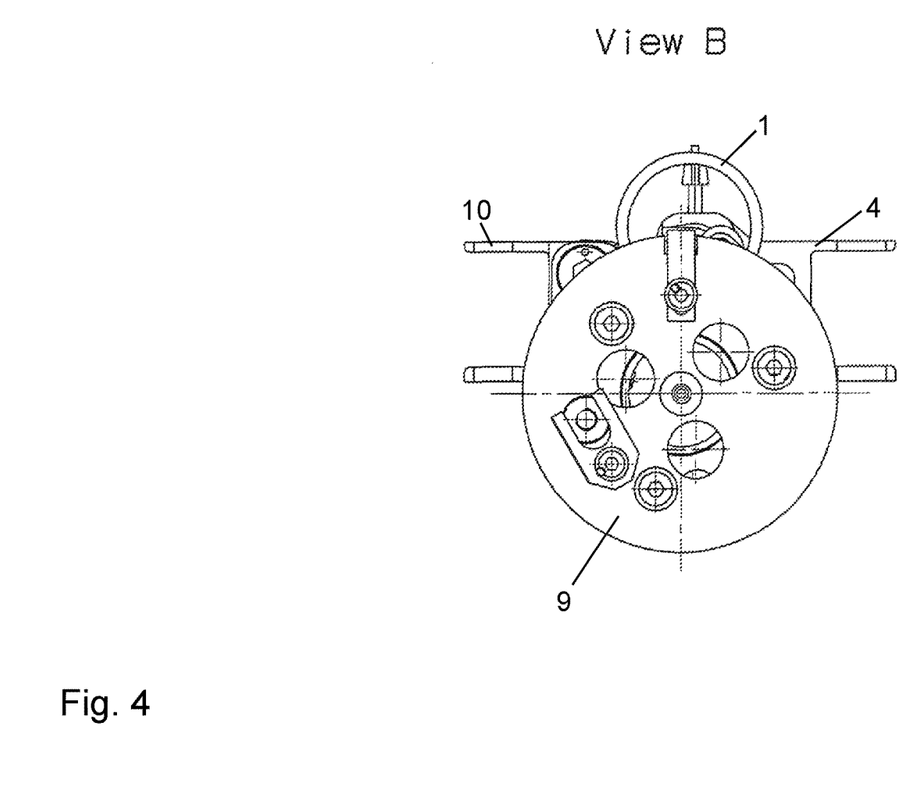
FIG. 4 shows a view of the joint in FIG. 1, in direction B.
Figure 5:
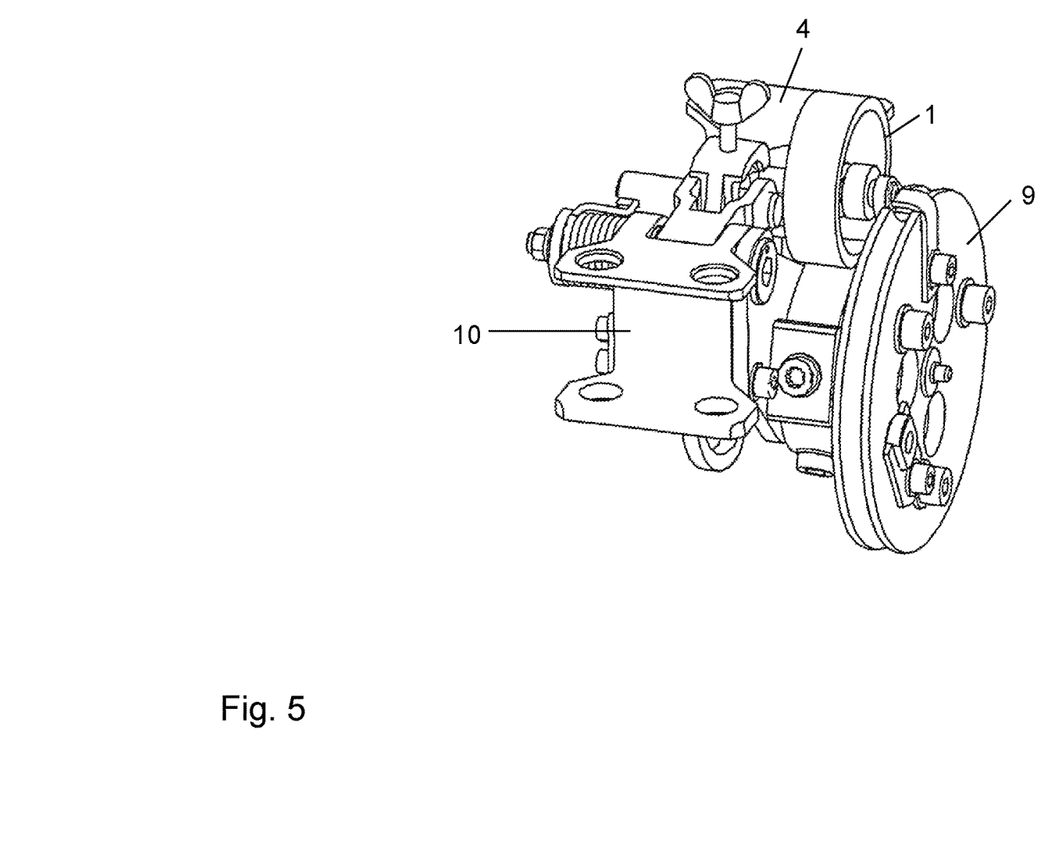
FIG. 5 shows a perspective view of the joint in FIG. 1.

A joint according to FIGS. 1 to 5, for the purpose of unfolding and locking solar panels of a solar generator, which are not illustrated here, has a fixed half joint 4 and a half joint 10 that is able to pivot, the same having a common axis 8 (cf. FIGS. 1 and 3). The fixed half joint 4 is termed a bearing support, and the pivotable half joint is termed a fork. The pivotable half joint 10 is mounted on the axis 8 in a manner allowing rotation. In FIG. 1 to FIG. 5, it is pivoted fully out by means of a drive spring 1 arranged on the axis 8. This means that solar panels (which are not illustrated), which are attached to the two half joints 4, 10 via round billets, lie in a plane, and/or are pivoted with respect to each other at an angle of 180°.

A fixed end of the drive spring 1 arranged on a drive roll, wherein the same is not visible in detail, is bolted to the fixed half joint 4 by means of connecting elements 11, 12, 13 (cf. FIG. 1 and FIG. 3). In addition, a locking fork 16 is mounted on the pivotable half joint 10, and receives a locking bolt 5. A yoke spring 6 is attached on the pivotable half joint 10, and shares an axis with the locking fork 16, wherein the legs of said yoke spring 6 pass through a head of the locking bolt 5 (cf. FIG. 1 and FIG. 2). The locking fork 16 and the yoke spring 6 are attached together to the pivotable half joint 10 by means of a screw 45. In FIGS. 1 to 5, the locking bolt 5 is pressed by the yoke spring 6 into a groove (FIG. 2), thereby locking the pivotable half joint 10 to the fixed half joint 4.

The principle of the construction of this joint is known, by way of example, from German patent document DE 196 49 741 A1, such that no further discussion is provided on the further details of the joint which are illustrated but which are not requisite for understanding the invention.

The drive spring 1 is, as can best be seen in FIG. 2, designed similarly to a constant force spring B-motor. The drive spring 1 is arranged on a drive roll, wherein a fixed end of the drive spring 1 is fixed to the drive roll, and a free end of the drive spring 1 runs around the joint axis 8. A drive spring designed in such a manner is fundamentally capable of releasing a constant unfolding torque over the actuation of the drive spring—meaning over the unfolding angle from 0° to 180°.

In order to keep the load on the materials of the individual components of an unfolding mechanism low—for example synchronization cables, rods, pulleys 9, and brackets, unfolding speed regulating mechanisms (motor gear unit MGU), etc.—a drive spring 1 used in the joint illustrated in FIGS. 1 to 5 has a progressive spring characteristic curve, which increases over the unfolding. In this way it is possible to compensate for a frictional torque that varies over the unfolding angle. Such a frictional torque that varies over the unfolding angle, and particularly increases, is primarily caused by the electrical conductors (not illustrated) of the solar generator or reflector, the same being routed across the joint axes and deformed during that unfolding.

The progressive spring characteristic curve functions such that the drive spring releases a lower torque at the beginning of the unfolding (starting from an angle of 0°) than at the end of the unfolding. The spring characteristic curve, which is determined by a geometrical design of the drive spring, is sized in this case in such a manner that it has a spring characteristic curve over the entire unfolding angle of 0 to 180° which preferably at least corresponds to the triple of the frictional torque. In this way, even in the worst case (with high frictional torques caused by the electrical conductors used for the purpose of transmitting electrical power), it is possible to provide an opening torque that is higher than the sum of all the applied frictional torques.

Figure 6:
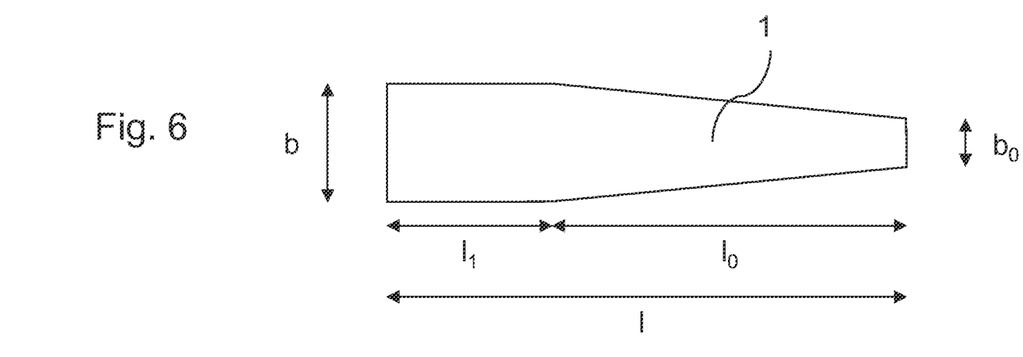
FIG. 6 shows a first embodiment of an extended drive spring for use in a joint according to FIGS. 1 to 5.
Figure 7:
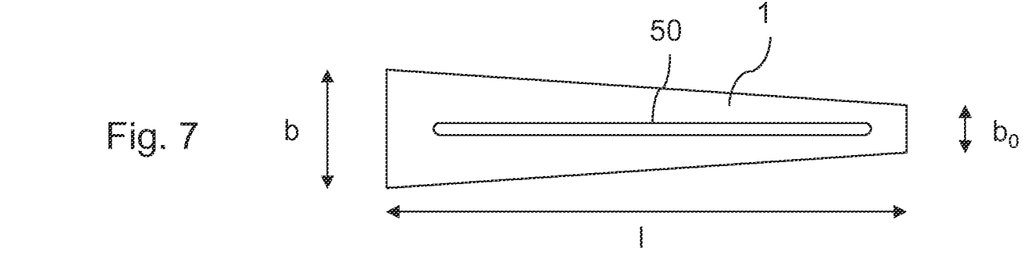
FIG. 7 shows a second embodiment of an extended drive spring for use in a joint according to FIGS. 1 to 5.

Such a characteristic curve of the drive spring 1 can be achieved in various different ways. By way of example, as is illustrated in FIGS. 6 and 7, the drive spring can be designed to be narrow towards its free end. When the solar generator is folded closed, the free end of the drive spring 1 is active. When unfolding, the active region of the drive spring shifts toward its inner, fixed end. Therefore, if the spring is wider towards the fixed end, the spring torque constantly increases over the unfolding.

In the embodiment variant according to FIG. 6, the spring 1 has a width b on its fixed end, the same being arranged on the drive roll. The width b is maintained over a length $l_1$. Subsequently, the spring becomes narrower towards its free end over the length $l_0$, to a width $b_0$ which is smaller than the width b. The entire length l of the spring, illustrated as extended, is therefore $l=l_1+l_0$.

In contrast, the embodiment variant according to FIG. 7 shows a trapezoidal shape which has a lesser width $b_0$ towards its free end than on its fixed end. Moreover, the spring which is illustrated in the embodiment in FIG. 7 as extended has an optional recess on the center line of the spring. In this case, only one single recess 50 is illustrated.

In a modification, which is not illustrated, multiple recesses arranged one behind the other could also be included on the center line of the spring, having the same or different lengths. The width of the recess is based on the spring characteristic curve to be achieved. The recess(es) could likewise be included in the embodiments according to FIGS. 6 and 8.

In a further modification, the outer contour of the extended spring can also have any other shape, if the same is suitable for providing the desired spring characteristic curve.

Figure 8:
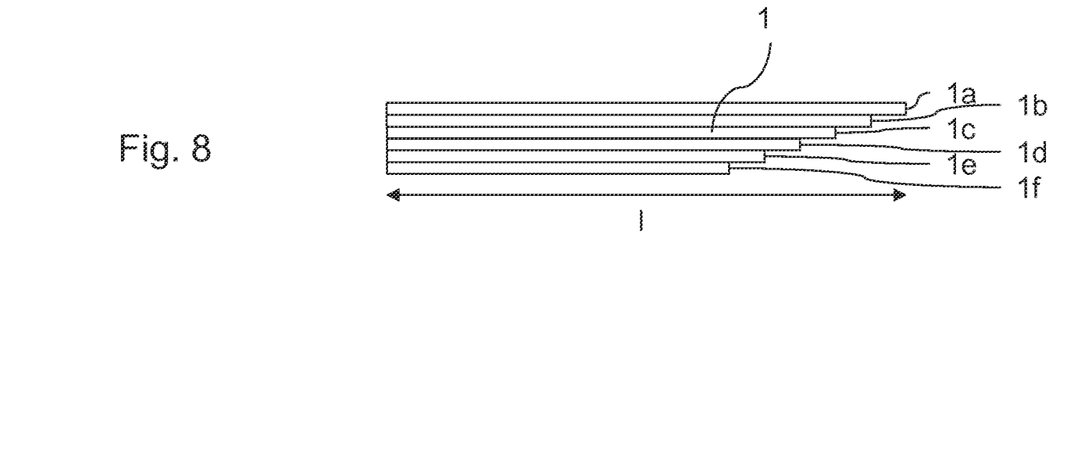
FIG. 8 shows a third embodiment of an extended drive spring for use in a joint according to FIGS. 1 to 5.

FIG. 8 shows a further embodiment of a drive spring 1 in a side view, wherein the drive spring 1 consists, as an example, only of a total of six individual leaves 1a, 1b, 1c, 1d, 1e, 1f. The leaves have different lengths. At the start of the unfolding, only a few spring leaves are active, on the free end of the drive spring. The more the joint opens, the more spring leaves are applied which in turn leads to the desired, increasing spring torque. The spring characteristic curve is not constant, in contrast to the variants illustrated in FIGS. 6 and 7. Rather, it has a nearly step-like profile.

In a further embodiment which is not illustrated, the natural radius of the drive spring is greater towards its free end. This can be achieved, by way of example, by a drive roll which is not circular. The radius of the drive roll in this case in incorporated into the formula for the calculation of the spring torque.

The design variants shown in FIGS. 6, 7, and 8, as well as the last variant above, can be fundamentally combined with each other.

In the sketched illustrations, the drive springs are illustrated in extended form, to clarify understanding of their design.

By using a progressive drive spring, as shown in FIGS. 6 to 8, it is possible for a torque to be released at the start of the unfolding, as is generated in the constant force springs used to date. The unfolding mechanisms are not subjected to higher loads with respect to their strength than in a conventional joint. However, as a result of the spring torque that increases over the unfolding, a higher spring torque is obtained at the end of the unfolding—by way of example, a spring torque which is twice as large—such that it is even possible to work with greater frictional torques. The dimensioning is such that the spring torque of the spring characteristic curve is such that the same is greater than the sum of all applied frictional torques by a factor of 3, at least at the end of the unfolding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 drive spring
4 (fixed) half joint
5 (locking) bolt
6 yoke spring
8 axis of rotation
9 pulley
10 (pivotable) half joint
11 connecting element
12 connecting element
13 connecting element
16 locking fork
45 screw
50 recess

The invention claimed is:

1. A joint for unfolding and locking a solar generator, a reflector, or other aerospace components that can be unfolded, consisting of:
   two half joints;
   a joint axis; and
   a drive, wherein a drive spring of the drive has a spring characteristic curve that compensates for a frictional torque that varies over the unfolding angle, the characteristic curve increasing over the unfolding progressively, over the unfolding angle of the two half joints.

2. The joint of claim 1, wherein the spring characteristic curve corresponds, over the entire unfolding angle, to at least a predetermined multiple of the frictional torque.

3. The joint of claim 2, wherein the predetermined multiple of the frictional torque is triple of the frictional torque of the half joints rotated against each other.

4. The joint of claim 2, wherein the spring characteristic curve corresponds, over the entire unfolding angle, exactly to the predetermined multiple of the frictional torque.

5. The joint of claim 4, wherein the predetermined multiple of the frictional torque is triple of the frictional torque of the half joints rotated against each other.

6. The joint of claim 1, wherein the drive is a constant force spring B-motor, wherein the drive spring is arranged on a drive roll, and a fixed end of the drive spring is fixed to the drive roll, and a free end of the drive spring runs around the joint axis.

7. The joint of claim 6, wherein the drive spring has a non-rectangular shape when it is extended.

8. The joint of claim 7, wherein the drive spring has a trapezoidal shape that is narrower towards its free end.

9. The joint of claim 6, wherein a natural radius of the drive spring is greater towards its free end.

10. The joint of claim 6, wherein the drive spring is formed from multiple leaves of different lengths.

11. The joint of claim 6, wherein the drive spring has one or more recesses along its center line.

* * * * *